United States Patent
Anderson

(10) Patent No.: US 9,022,070 B2
(45) Date of Patent: May 5, 2015

(54) BOLTED VALVE CONTROL ELEMENT

(75) Inventor: Shawn W. Anderson, Haverhill, IA (US)

(73) Assignee: Fisher Controls International LLC, Marshalltown, IA (US)

(*) Notice: Subject to any disclaimer, the term of this patent is extended or adjusted under 35 U.S.C. 154(b) by 0 days.

(21) Appl. No.: 13/550,171

(22) Filed: Jul. 16, 2012

(65) Prior Publication Data
US 2014/0014865 A1   Jan. 16, 2014

(51) Int. Cl.
*F16K 1/48*   (2006.01)
*F16K 3/24*   (2006.01)
*F16K 1/46*   (2006.01)
*F16K 47/04*  (2006.01)
*F16K 39/04*  (2006.01)

(52) U.S. Cl.
CPC . *F16K 1/46* (2013.01); *F16K 3/246* (2013.01); *F16K 47/04* (2013.01); *F16K 39/04* (2013.01); *F16K 1/487* (2013.01); *F16K 3/243* (2013.01)

(58) Field of Classification Search
CPC ........... F16K 3/246; F16K 1/46; F16K 3/243; F16K 47/04; F16K 39/04; F16B 39/26
USPC ................. 251/319, 325, 291, 292, 282, 357; 137/625.33, 625.37, 625.38, 625.3, 137/315.27; 411/313, 943
See application file for complete search history.

(56) References Cited

U.S. PATENT DOCUMENTS

| | | | |
|---|---|---|---|
| 2,151,919 A | 3/1939 | Jacobson | |
| 2,334,686 A * | 11/1943 | Binnall | 251/118 |
| 2,593,740 A * | 4/1952 | Faust | 251/357 |
| 3,101,210 A | 8/1963 | Johnson | |
| 5,236,014 A * | 8/1993 | Buls et al. | 137/625.3 |
| 5,431,188 A | 7/1995 | Cove | |
| 7,387,292 B1 * | 6/2008 | Fleming | 251/357 |
| 7,721,753 B2 | 5/2010 | Wears | |
| 2004/0200989 A1 * | 10/2004 | Camp et al. | 251/326 |
| 2005/0191122 A1 | 9/2005 | Gethmann | |
| 2009/0146096 A1 * | 6/2009 | Davies et al. | 251/333 |
| 2010/0043893 A1 | 2/2010 | Stenberg | |

FOREIGN PATENT DOCUMENTS

| | | |
|---|---|---|
| FR | 2 389 054 A1 | 11/1978 |
| FR | 2 393 214 A1 | 12/1978 |
| GB | 200923 A | 7/1923 |
| GB | 247589 A | 6/1926 |
| GB | 2 043 216 A | 10/1980 |
| JP | 10-268944 | 10/1998 |

OTHER PUBLICATIONS

International Search Report and Written Opinion for Application No. PCT/US2013/049850, dated Oct. 22, 2013.
International Preliminary Report on Patentability for Application No. PCT/US2013/049850, dated Jan. 20, 2015.

* cited by examiner

*Primary Examiner* — Atif Chaudry
(74) *Attorney, Agent, or Firm* — Marshall, Gerstein & Borun LLP

(57) ABSTRACT

A control element for a fluid flow control device includes a stem, a plug, and a fastener. The stem includes an elongated member with a first end and a second end. The first end is adapted to be operably coupled to an actuator and the second end including a fastener recess including a plurality of internal threads. The plug is disposed adjacent to the second end of the stem. The fastener fixing the plug to the stem and includes a threaded portion extending from the plug and engaging the plurality of internal threads of the fastener recess.

33 Claims, 5 Drawing Sheets

BOLTED VALVE CONTROL ELEMENT

FIELD OF THE DISCLOSURE

The present disclosure is directed to sliding stem fluid flow control devices and, more particularly, control elements for sliding stem fluid flow control devices.

BACKGROUND

Conventional control elements for sliding stem fluid flow control devices include plug/stem connections that utilize an outer threaded shaft of the stem secured into a female threaded hole tapped into the top of the plug. Once the two components are screwed together, some kind of anti-rotation device is implemented to keep the joint from loosening. A typical anti-rotation device includes a tack weld or a pin pressed or punched into a common hole drilled through the stem and into the plug adjacent to the female hole. Process vibrations can lead to loosening of these pin-type connection and cracking of these welded connections.

SUMMARY

A control element for a fluid flow control device includes a stem, a plug, and a fastener. The stem includes an elongated member with a first end and a second end. The first end is adapted to be operably coupled to an actuator and the second end including a fastener recess including a plurality of internal threads. The plug is disposed adjacent to the second end of the stem. The fastener fixing the plug to the stem and includes a threaded portion extending from the plug and engaging the plurality of internal threads of the fastener recess.

DETAILED DESCRIPTION

Figure 1:
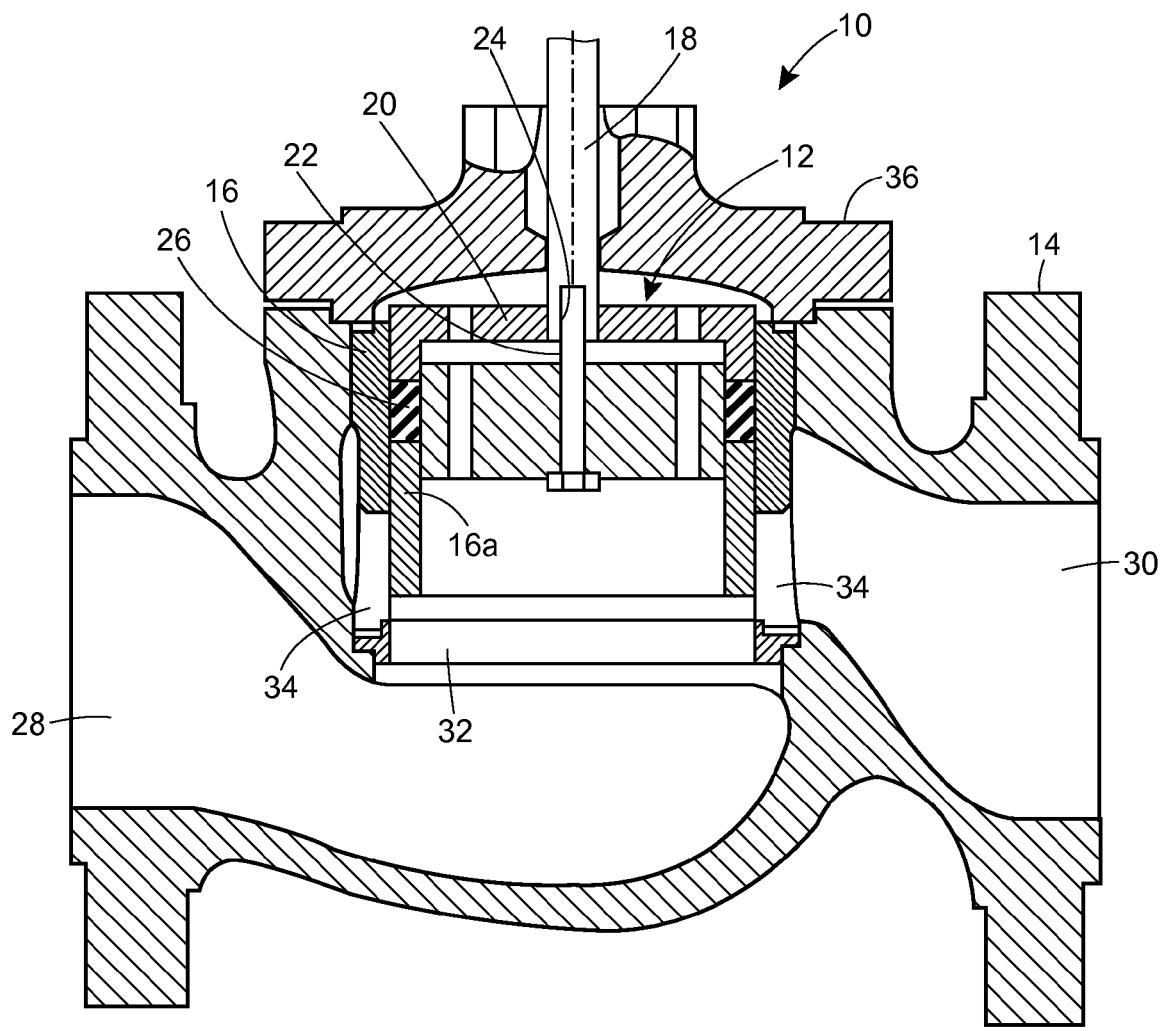
FIG. 1 is a cross-sectional side view of a fluid flow control device including a control element constructed in accordance with the principles of the present disclosure.

FIG. 1 is a cross-sectional side view of one example of a fluid flow control device 10 (e.g., a control valve) including a bolted valve control element 12 constructed in accordance with the principles of the present disclosure. As depicted, the control device 10 includes a valve body 14, a cage 16, and the control element 12. As will be described more fully below, the control element 12 of the control device 10 includes a stem 18 and a plug assembly 20 fixed to the stem 18 with a fastener 22 threaded into a stem recess 24 formed in the stem 18. As will be described, in FIGS. 1-4 of the present disclosure, the plug 20 refers to a two piece plug assembly that comprises a plug and a compression cap. This configuration advantageously facilitates assembly of the control element 16 and, in the specific example depicted, axially compresses and radially expands a seal member 26 carried by the plug 20 and sealing against the cage 16.

Still referring to FIG. 1, the valve body 14 of the disclosed example includes a globe-style valve body including an inlet 28, an outlet 30, and a gallery 32 disposed between the inlet 28 and the outlet 30. Based on this identification of the inlet 28 and outlet 30, the valve body 14 is arbitrarily arranged in a flow-up configuration for the sake of discussion only. The valve body 14 can also be arranged and configured in a flow-down configuration with the inlet and outlet switched without departing from the spirit of this disclosure.

The cage 16 is mounted within the gallery 32 of the valve body 14 in a conventional manner and includes a hollow cylindrical member defining a plurality of openings 34 allowing the passage of fluid through the valve body 14 and more specifically through the gallery 32. The plug 20 of the control element 12 is slidably disposed in the cage 16 for controlling the flow of fluid through the valve body 14. The stem 18 of the control element 12 extends out of the valve body 14 for being attached to an actuator (not shown), for example. The control device 10 further includes a bonnet cap 36 fixed to the valve body 14 adjacent to the gallery 32 in a conventional manner to retain the cage 16 in position and assist with guiding the control element 12 in a conventional manner.

Figure 2:
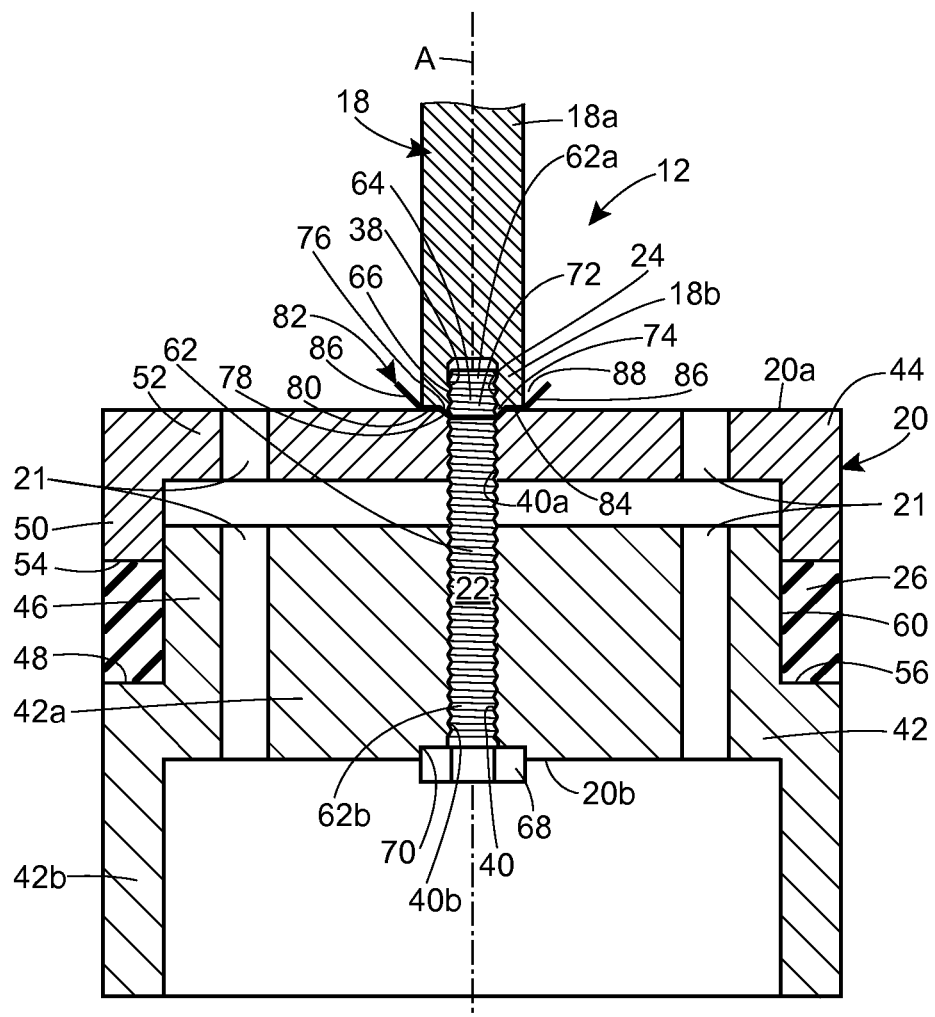
FIG. 2 is a cross-sectional side view of one example of a control element constructed in accordance with the principles of the present disclosure.

With reference to FIG. 2, the control element 12 of the present example will be described more fully. As mentioned, the control element 12 includes the stem 18 including the stem recess 24, the plug 20, and the fastener 22.

As shown, the stem 18 includes a generally elongated rigid rod extending along a sliding axis A and having a first end 18a and a second end 18b. The first end 18a is adapted to be disposed outside of the valve body 14 and bonnet 36, as shown in FIG. 1, for being operably connected to an actuator, for example. The second end 18b, as shown in FIG. 2, defines the stem recess 24, which includes a cylindrical recess defining a plurality of internal threads 38.

The plug 20 is disposed adjacent to the second end 18b of the stem 18 and includes a through-bore 40, a plug body 42, a compression cap 44, and the seal member 26 mentioned above with respect to FIG. 1. The plug 20 defines a first horizontal surface 20a that is located adjacent to the second end 18b of the stem 18 and a second horizontal surface 20b that is spaced from the second end 18b of the stem 18. In the depicted example, the through-bore 40 includes a first portion 40a that passes through the compression cap 44 and a second portion 40b that passes through the plug body 42. The depicted example of the plug 20 also includes pressure registration openings 21 such that the valve 10 in FIG. 1 can operate as a balanced valve. Other plugs 20 included within this description can be constructed without such openings 21.

The plug body 42 includes a generally cylindrical body including a sealing portion 42a and a skirt portion 42b extending downward from the sealing portion 42a. The sealing portion 42a defines the second horizontal surface 20b of the plug 20 and includes a reduced diameter portion 46 adjacent to the compression cap 44. As shown, the reduced diameter portion 46 includes an outer cylindrical surface 60 and the plug body 42 further defines a compression surface 48 extending radially outward from the outer cylindrical surface 60 of the reduced diameter portion 46. The compression cap 44 also includes a generally cylindrical member mating with the plug body 42 and, more specifically, includes a cylindrical sidewall 50 and a flat cap plate 52 such that the compression cap 44 resembles an upside-down cup shape. In the depicted example, the flat cap plate 52 of the compression cap 44 defines the first horizontal surface 20a of the plug 20. The cylindrical sidewall 50 of the compression cap 44 extends downward from the flat cap plate 52 and defines a compression surface 54.

As shown, the compression cap 44 is disposed adjacent to the second end 18b of the stem 18 and between the second end 18b of the stem 18 and the plug body 42. So configured, the compression surface 54 of the compression cap 44 faces the compression surface 48 of the plug body 42 adjacent to the outer cylindrical surface 60 of the reduced diameter portion 46 of the plug body 42 to define an annular sealing gap 56 receiving the seal member 26. Thus, as shown, the sealing member 26 is disposed axially between the compression surface 54 of the compression cap 44 and the compression surface 48 of the plug body 42. So configured, compressing the compression cap 44 and the plug body 42 together axially compresses the seal member 26, which in turn, causes the seal member 26 to expand radially and sealingly engage an inner surface 16a of the cage 16, as shown in FIG. 1, as well as the outer circumferential surface 60 of the reduced diameter portion 46 of the plug body 42. This radial expansion provides a fluid tight seal between the plug 20 and the cage 16. The seal member 26 can be a graphite seal, an o-ring, a packing material, or any other material or construct of multiple materials suitable for serving the intended purpose.

Still referring to FIG. 2, the fastener 22 of the present example control element 12 includes an elongated shank 62 disposed through the first and second portions 40a, 40b of the through-bore 40 of the plug 20 and disposed along the same sliding axis A as the stem 18. The elongated shank 62 includes a first end 62a and a second end 62b. The first end 62a includes a threaded portion 64 that extends upward and away from the plug 20 and includes a plurality of external threads 66 threadably engaging the plurality of internal threads 38 defined in the stem recess 24 of the stem 18. The second end 62b of the shank 62 includes a head 68 that has a radial dimension that is larger than the shank 62 for abutting the plug body 42 at or adjacent to the second horizontal surface 20b of the plug 20, thereby axially positioning the shank 62 relative to the plug 20. In the depicted example, the head 48 can include a hexagonal shape and the plug body 42 can define a head recess 70 with one or more flat surfaces receiving the head 48. For example, the head recess 70 can include a hexagonal shape or a circle shape with a single flat sidewall for abutting one or more of the flat sides of the hexagonal head 48 of the fastener 22. So configured, the one or more flat surfaces of the head recess 70 prevents rotation of the head 68 of the fastener 22, and therefore, the entire fastener 22 relative to the plug 20. The head 68 and corresponding head recess 70 also advantageously cooperate to assist with maintaining the alignment of the fastener 22 and stem 18 relative to the plug 20.

The control element 12 of FIG. 2 also includes additional features for aligning the fastener 22 and stem 18 relative to the plug 20. Specifically, as shown in FIG. 2, the first surface 20a of the plug 20 includes a circular recess 72 with an angled sidewall 74 extending from the first surface 20a of the plug 20 to a location at or near the through-bore 40. The sidewall 74 is disposed at an acute angle relative to the sliding axis A extending along the longitudinal axis of the stem 18 and fastener 22. Thus, the circular recess 72 acts as a counterbore. The second end 18b of the stem 18 is contoured to reside within the circular recess 72 and, specifically, in this example includes a protrusion 76 with a tapered surface 78. Similar to the angled surface 74 of the plug 20, the tapered surface 78 of the stem 18 is disposed at an acute angle relative to the sliding axis A extending along the longitudinal axis of the stem 18 and fastener 22. The protrusion 76 is disposed in the circular recess 72 and the tapered surface 78 engages the angled surface 74 with surface contact. Line contact between the angled and tapered surfaces 74, 78 is also possible. In the disclosed example, the second end 18b of the stem 18 further includes a flat ring surface 80 that circumscribes the protrusion 76 and is disposed within a plane that is generally perpendicular to the sliding axis A. As such, the flat ring surface 80 applies a force to the first surface 20a of the plug 20, as shown. In this example, the engagement between the angled and tapered surfaces 74, 78, as well as the force applied to the first surface 20a of the plug 20 by the flat ring surface 80, individually and in combination, assist with maintaining the alignment of the stem 18 and plug 20 under the influence of the fastener 22 threadably engaging the stem recess 24.

As mentioned, the head 68 of the fastener 22 of the present example control element 12 is disposed in the head recess 70 of the plug 20 for preventing rotation of the fastener 22 relative to the plug 20. To prevent rotation of the stem 18 relative to the plug 20, the control element 12 of the present example can include an anti-rotation device 82 disposed between the second end 18b of the stem 18 and the first surface 20a of the plug 20. In this example, the anti-rotation device 82 includes a washer 84 having a circular body and one or more lock tabs 86 extending radially outward therefrom. Additionally, the second end 18b of the stem 18 includes one or more flat surfaces 88 for receiving the one or more lock tabs 86, when the lock tabs 86 are bent upward away from the first surface 20a of the plug 20. With the fastener 22 threadably engaging the stem recess 24, the washer 84 is compressed between the second end 18b of the stem 18 and the first surface 20a of the plug 20 in this example. Therefore, the flat ring surface 80 of the stem 18 applies a force to the first surface 20a of the plug 20 that is transferred through the washer 84. In other examples, however, the control element 12 may not include the washer 84 and as such, the flat ring surface 80 can directly engage and apply the force to the first surface 20a of the plug 20.

Figure 3:
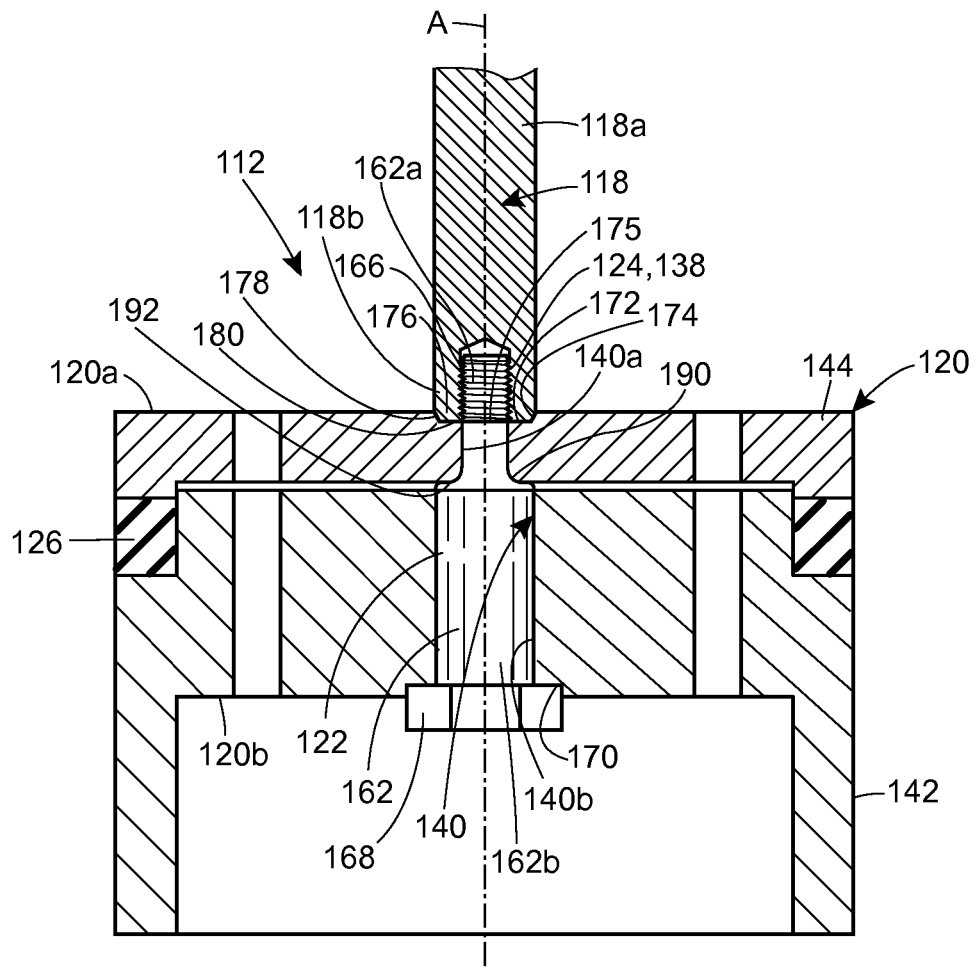
FIG. 3 is a cross-sectional side view of another example of a control element constructed in accordance with the principles of the present disclosure.

While the control element 12 in FIGS. 1 and 2 has been described as including various features for facilitating the alignment and rotational disposition of the different components, FIG. 3 depicts an alternative approach.

FIG. 3 depicts a control element 112 that is substantially similar to the control element 12 in that it includes a stem 118, a plug 120, and a fastener 122 fastening the plug 120 to the stem 118. The stem 118 extends along a sliding axis A and includes a first end 118a and a second end 118b. The second end defines a stem recess 124 having a plurality of internal threads 138. The plug 120 defines a first horizontal surface 120a disposed adjacent to the second end 118b of the stem 118 and a second horizontal surface 120b disposed or spaced away from the second end 118b of the stem 118. The plug 120 further includes a through-bore 140, a plug body 142, a compression cap 144, and a seal member 126. The through-bore 140 includes a first portion 140a passing through the compression cap 144 and a second portion 140b extending through the plug body 142. The fastener 122 includes an elongated shank 162 including a first end 162a and a second end 162b and which extends through the through-bore 140 in a manner similar to that described above with reference to FIG. 2. The first end 162a includes a threaded portion 164 extending upward and away from the plug 120 and which includes a plurality of external threads 166 in threaded engagement with the plurality of internal threads 138 of the stem recess 124 of the stem 118. The second end 162b includes a head 168 disposed adjacent to the second horizontal surface 120b of the plug 120 for positioning the fastener 122 as desired. Like the control element 12 described above with reference to FIG. 2, the plug body 142 includes a head recess 170 formed in the second horizontal surface 120b for receiving and preventing rotation of the head 168 of the fastener 122.

The primary distinction between the control element 112 in FIG. 3 and the control element 12 in FIG. 2 relates to how the fastener 122, plug 120, and stem 118 are aligned along the sliding axis A. For example, in FIG. 3, the second end 162b of the elongated shank 162 of the fastener 122 has a larger diameter than the first end 162 of the elongated shank 162. As such, the shank 162 further defines a shank shoulder 190 extending between the first and second ends 162a, 162b. Similarly, in FIG. 3, the second portion 140b of the through-bore 140 has a larger diameter than the first portion 140a of the through-bore 140. As such, the plug 120 and, more particularly in this example, the compression cap 144 of the plug 120 defines a plug shoulder 192 that is engaged by the shank shoulder 190. The shank shoulder 190 and plug shoulder 192 can include generally planar surfaces that extend in a plane that is transverse to the sliding axis A, or the shoulders 190, 192 can be contoured, tapered, or otherwise configured. For example, as depicted in FIG. 3, the plug shoulder 192 can be an annularly extending convexly curved bull-nose type surface and the shank shoulder 190 can be a corresponding annularly extending concave type surface such as to facilitate alignment and engagement between these two shoulders 190, 192 and therefore alignment between the fastener 122 and the plug 120.

An additional distinction from the control element 12 described with reference to FIG. 2 is the specific configuration of the second end 118b of the stem 118 and corresponding circular recess 172 in the first surface 120a of the plug 120. That is, the circular recess 172 is formed adjacent to the first portion 140a of the through-bore 140 and includes an angled sidewall 174 and a flat floor surface 175. The angled sidewall 174 circumscribes the flat floor surface 175 and the flat floor surface 175 circumscribes the through-bore 140. The angled sidewall 174 is angled relative to the sliding axis A while the flat floor surface 175 is disposed in a plane that is generally perpendicular to the sliding axis A. The second end 118b of the stem 118 includes a protrusion 176 extending therefrom defining a tapered surface 178 and a flat ring surface 180. In this example, the flat ring surface 180 is circumscribed by the tapered surface 178. So configured, and as depicted in FIG. 3, when the fastener 122 pulls the stem 118 into engagement with the plug 120, the flat ring surface 180 of protrusion 176 of the stem 118 engages the flat floor surface 175 of the circular recess 172 of the plug 120, and the tapered surface 178 of the protrusion 176 of the stem 118 engages the angled sidewall 174 of the circular recess 172 of the plug 120. These engaging surfaces assist with initially aligning and maintaining the alignment of the stem 118 and the valve plug 120 along the sliding axis A.

While the control element 112 has not been described as including a specific anti-rotation device between the stem 118 and the plug 120, it could include an anti-rotation device similar to the anti-rotation 82 described with reference to FIG. 2, or any other suitable type of anti-rotation device.

Figure 4:
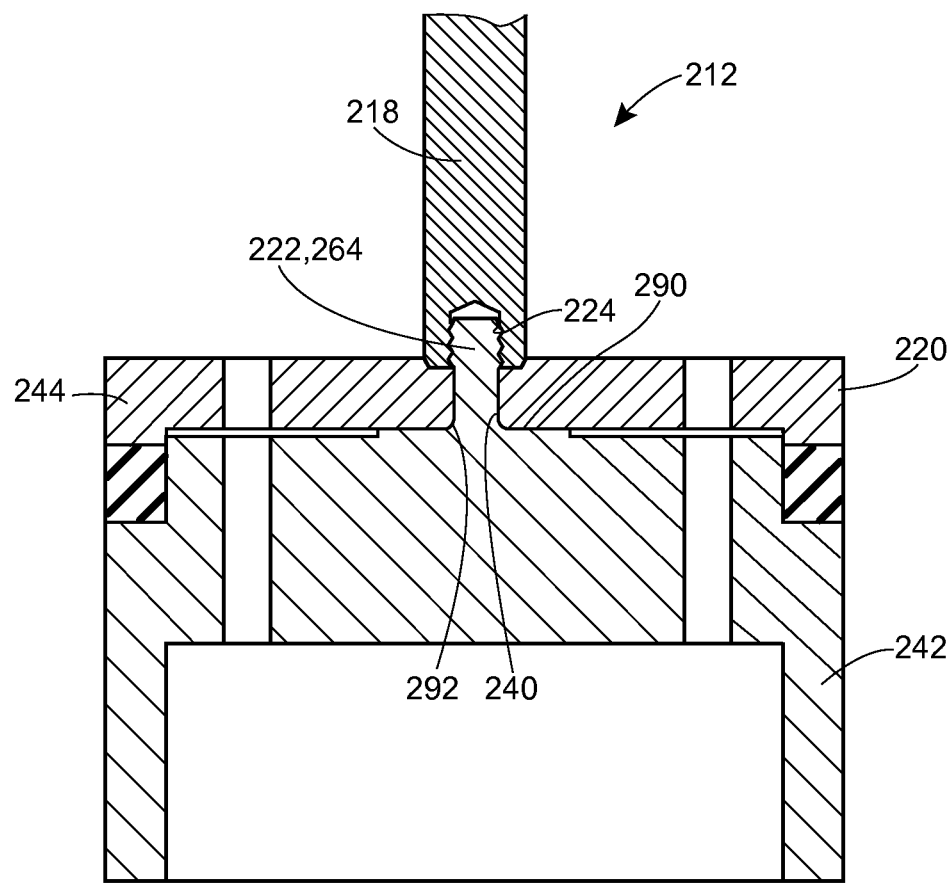
FIG. 4 is a cross-sectional side view of still another example of a control element constructed in accordance with the principles of the present disclosure.

While the control elements 12, 112 thus far disclosed have been described as including fasteners 12, 112 that resemble bolt-like components and which are separate and distinct components from the plugs 20, 120, the fastener can alternatively be formed as one piece (e.g., integral) with at least a portion of the plug. For example, FIG. 4 depicts another control element 212 including a plug 220 and fastener 222 formed as one piece with a plug body 242 of the plug 220 and extends through a through-bore 240 in a compression cap 244. More specifically, the fastener 222 includes a threaded portion 264 extending upward and away from the plug 220 and into a corresponding stem recess 224 in the stem 218. In the example depicted in FIG. 4, the plug body 242 itself defines a shank shoulder 290 and the compression cap 244 defines the plug shoulder 292 such that the control element 212 facilitates alignment of the various components in a manner similar to that which was described with reference to FIG. 3. It should be appreciated, however, that this one-piece (e.g., integral) construct could also be implemented into the example depicted in FIG. 2.

Figure 5:
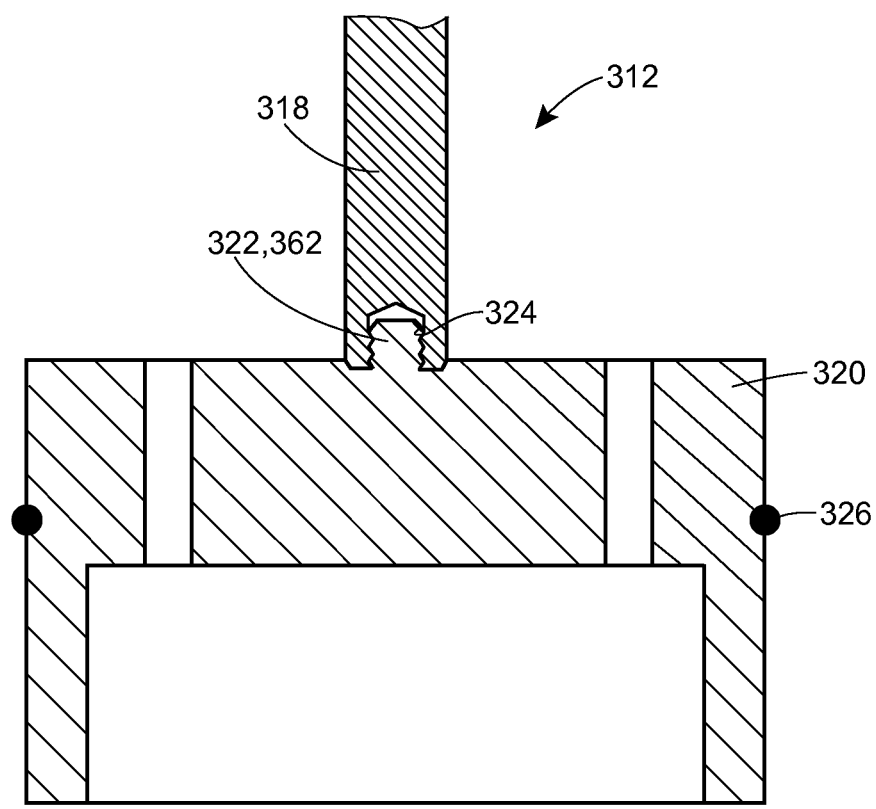
FIG. 5 is a cross-sectional side view of still yet another example of a control element constructed in accordance with the principles of the present disclosure.

While each of the plugs 20, 120, 220 of the various control elements 12, 112, 212, have thus far been described as including plug bodies 42, 142, 242 and compression caps 44, 144, 244 for compressing a radially expanding seal member, a simplified version of a control element 312 constructed within the scope of the disclosure is depicted in FIG. 5. In FIG. 5, the control element 312 includes a simple one-piece balanced plug 320 with a fastener 322 having a threaded portion 362 extending upward and away therefrom and in threaded engagement with a stem recess 324 of a stem 318. In this example, the plug 320 can optionally be equipped with one or more seals 326 carried by one or more grooves in its outer sidewall for sealing against a cage, as depicted in FIG. 1.

From the foregoing, it should be appreciated that each of the control elements 12, 112, 212, 312 described herein provides a simple construct that is easy to assemble either in the factory or in the field by removing the control element from a corresponding fluid flow control device. That is, the under-mounted fasteners 22, 122, 222, 322 disclosed herein operate similar to sex bolts to simply and securely mount the plug to the stem. One advantage of the disclosed control elements 12, 112, 212, 312 is that they do not require welding or press-pinning, which can be difficult to achieve in the field. Nevertheless, the scope of the present disclosure is intended to include such features. For example, as an alternative to the anti-rotation device 82 described herein with reference to FIG. 2, any one of the control elements 12, 112, 212, 312 described herein or otherwise that fall within the scope of the present disclosure could include a weld bead, a press-pin, separate screw pin, retaining clip, or any other alternative anti-rotation device that might be suitable. Yet another advantage of the disclosed control elements 12, 112, 212, 312 is the self-aligning features built into the fasteners, plugs, and stems. This ensures that these components are precisely aligned along the slidable axis A to reduce trim component wear and increase useful life.

While the foregoing disclosure provides various examples of devices and systems of the present invention, the disclosure is not limited to the specific examples disclosed. Rather, any one or more features of any one or more of the examples can be commingled, interchanged, or otherwise combined to arrive at still yet other examples not expressly disclosed. The disclosure of one feature in one example does not preclude the incorporation of that feature in other examples, but rather, it expressly provides that such a feature can be implemented into any other example.

What is claimed:
1. A control element for a fluid flow control device, the control element comprising:
 a stem comprising an elongated member with a first end and a second end, the first end adapted to be operably coupled to an actuator and the second end including a fastener recess including a plurality of internal threads;
 a plug disposed adjacent to the second end of the stem;

a fastener fixing the plug to the stem, the fastener including a threaded portion extending from the plug and engaging the plurality of internal threads of the fastener recess; and an anti-rotation device disposed between the second end of the stem and the plug for preventing rotation of the stem relative to the plug and fastener, wherein the anti-rotation device comprises washer having a disc-shaped body and one or more tabs extending radially outwardly from the disc-shaped body, and the second end of the stem includes one or more flat surfaces each engaging a corresponding tab of the one or more tabs.

2. The control element of claim 1, wherein the plug comprises a compression cap, a plug body, and a seal member disposed between the compression cap and the plug body, and wherein the engagement between the fastener and the fastener recess compresses the seal member between the compression cap and the plug body.

3. The control element of claim 2, wherein the compression cap is disposed between the second end of the stem and the plug body.

4. The control element of claim 1, wherein the fastener is formed as one piece with at least a portion of the plug.

5. The control element of claim 4, wherein the fastener is formed as one piece with the plug body of the plug.

6. The control element of claim 1, wherein the plug defines a through-bore, a first surface adjacent to the second end of the stem, and a second surface spaced from the stem.

7. The control element of claim 6, wherein the fastener comprises an elongated shank disposed through the through-bore in the plug and having a first end and a second end, the first end of the shank including the threaded portion of the fastener disposed in the fastener recess, the second end of the shank including a head disposed adjacent the second surface of the plug.

8. The control element of claim 7, further comprising a head recess disposed in the second surface of the plug, the head of the fastener being disposed in the head recess for preventing rotation of the head relative to the plug.

9. The control element of claim 7, wherein the first end of the shank of the fastener includes a first diameter and the second end of the shank of the fastener includes a second diameter that is larger than the first diameter.

10. The control element of claim 9, wherein the shank further comprises a shank shoulder disposed between the first and second ends and the plug comprises a plug shoulder engaged by the shank shoulder for aligning the fastener and the plug.

11. The control element of claim 1, wherein the second end of the stem further comprises a flat ring surface circumscribing the tapered surface and engaging the plug outside of the circular recess for aligning the stem and the plug.

12. The control element of claim 1, wherein the plug includes a circular recess with an angled sidewall and the second end of the stem includes a tapered surface engaging the angled sidewall of the circular recess for aligning the stem and the plug.

13. The control element of claim 12, wherein the circular recess in the plug further comprises flat floor surface circumscribed by the angled sidewall and the second end of the stem further comprises a flat ring surface circumscribed by the tapered surface, the flat ring surface of the stem engaging the flat floor surface of the recess in the plug.

14. A fluid flow control device, comprising:
a valve body including an inlet, an outlet, and a gallery disposed between the inlet and the outlet;

a cage mounted within the gallery and including a plurality of openings for allowing the passage of fluid through the cage and the gallery;

a control element including a stem, a plug, and a fastener fixing the plug to the stem, the plug being slidably disposed within the cage for controlling the flow of fluid through the valve body, the stem comprising an elongated member with a first end and a second end, the first end extending out of the valve body for being operably coupled to an actuator, the second end including a fastener recess including a plurality of internal threads, the plug disposed adjacent to the second end of the stem, and the fastener including a threaded portion extending from the plug and engaging the plurality of internal threads of the fasten er recess; and an anti-rotation device disposed between the second end of the stem and the plug for preventing rotation of the stem relative to the plug and fastener, wherein the anti-rotation device comprises washer having a disc-shaped body and one or more tabs extending radially outwardly from the disc-shaped body, and the second end of the stem includes one or more flat surfaces each engaging a corresponding tab of the one or more tabs.

15. The device of claim 14, wherein the plug comprises a compression cap, a plug body, and a seal member disposed between the compression cap and the plug body, and wherein the engagement between the fastener and the fastener recess compresses the seal member between the compression cap and the plug body.

16. The device of claim 15, wherein the compression cap is disposed between the second end of the stem and the plug body.

17. The device of claim 14, wherein the fastener is formed as one piece with at least a portion of the plug.

18. The device of claim 17, wherein the fastener is formed as one piece with the plug body of the plug.

19. The device of claim 14, wherein the plug defines a through-bore, a first surface adjacent to the second end of the stem, and a second surface spaced from the stem.

20. The device of claim 19, wherein the fastener comprises an elongated shank disposed through the through-bore in the plug and having a first end and a second end, the first end of the shank including the threaded portion of the fastener disposed in the fastener recess, the second end of the shank including a head disposed adjacent the second surface of the plug.

21. The device of claim 20, further comprising a head recess disposed in the second surface of the plug, the head of the fastener being disposed in the head recess for preventing rotation of the head relative to the plug.

22. The device of claim 20, wherein the first end of the shank of the fastener includes a first diameter and the second end of the shank of the fastener includes a second diameter that is larger than the first diameter.

23. The device of claim 22, wherein the shank further comprises a shank shoulder disposed between the first and second ends and the plug comprises a plug shoulder engaged by the shank shoulder for aligning the fastener and the plug.

24. The device of claim 14, wherein the second end of the stem further comprises a flat ring surface circumscribing the tapered surface and engaging the plug outside of the circular recess for aligning the stem and the plug.

25. The control element of claim 14, wherein the plug includes a circular recess with an angled sidewall and the second end of the stem includes a tapered surface engaging the angled sidewall of the circular recess for aligning the stem and the plug.

26. The device of claim 25, wherein the circular recess in the plug further comprises flat floor surface circumscribed by the angled sidewall and the second end of the stem further comprises a flat ring surface circumscribed by the tapered surface, the flat ring surface of the stem engaging the flat floor surface of the recess in the plug.

27. A control element for a fluid flow control device, the control element comprising:
    a stem comprising an elongated member with a first end and a second end, the first end adapted to be operably coupled to an actuator and the second end including a fastener recess including a plurality of internal threads;
    a plug disposed adjacent to the second end of the stem, the plug comprising a through-bore, a plug body, a compression cap, and a seal member, the compression cap disposed between the second end of the stem and the plug body, the seal member disposed between the compression cap and the plug body, the compression cap defining a first surface of the plug adjacent to the second end of the stem, and the plug body defining a second surface of the plug spaced from the second surface of the stem;
    a fastener including an elongated shank disposed through the through-bore in the plug and having a first end and a second end, the first end of the shank including a threaded portion engaging the plurality of internal threads in the fastener recess of the stem, the second end of the shank including a head disposed adjacent to the second surface of the plug, thereby compressing the seal member between the compression cap and the plug body; and
    an anti-rotation device disposed between the second end of the stem and the first surface of the plug for preventing rotation of the stem relative to the plug and fastener, wherein the anti-rotation device comprises washer having a circular body and one or more tabs extending radially outwardly from the circular body, and the second end of the stem includes one or more flat surfaces each engaging a corresponding tab of the one or more tabs.

28. The control element of claim 27, further comprising a head recess disposed in the second surface of the plug, the head of the fastener being disposed in the head recess and preventing rotation of the head relative to the plug.

29. The control element of claim 27, wherein the second end of the stem further comprises a flat ring surface circumscribing the tapered surface and engaging the first surface of the plug outside of the circular recess for aligning the stem and the plug.

30. The control element of claim 27, wherein the first end of the shank of the fastener includes a first diameter and the second end of the shank of the fastener includes a second diameter that is larger than the first diameter.

31. The control element of claim 30, wherein the shank further comprises a shank shoulder disposed between the first and second ends and the plug includes a plug shoulder engaged by the shank shoulder for aligning the fastener and the plug.

32. The control element of claim 27, wherein the first surface of the plug includes a circular recess with an angled sidewall and the second end of the stem includes a tapered surface engaging the angled sidewall of the circular recess for aligning the stem and the plug.

33. The control element of claim 32, wherein the circular recess in the plug further comprises flat floor surface circumscribed by the angled sidewall and the second end of the stem further comprises a flat ring surface circumscribed by the tapered surface, the flat ring surface of the stem engaging the flat floor surface of the recess in the plug.

* * * * *

UNITED STATES PATENT AND TRADEMARK OFFICE
CERTIFICATE OF CORRECTION

Page 1 of 1

PATENT NO.         : 9,022,070 B2
APPLICATION NO.    : 13/550171
DATED              : May 5, 2015
INVENTOR(S)        : Shawn W. Anderson It is certified that error appears in the above-identified patent and that said Letters Patent is hereby corrected as shown below:

In the Specification:

At Column 3, line 39, "head 48" should be -- head 68 --.

At Column 3, line 42, "head 48." should be -- head 68. --.

At Column 3, line 44, "head 48" should be -- head 68 --.

At Column 5, line 10, "first end 162" should be -- first end 162a --.

In the Claims:

At Column 8, line 17, claim 14, "fasten er" should be -- fastener --.

At Column 8, line 66, claim 25, "control element" should be -- device --.

Signed and Sealed this
Twenty-third Day of February, 2016

Michelle K. Lee
*Director of the United States Patent and Trademark Office*